United States Patent [19]

Mookerjea et al.

[11] Patent Number: 4,775,483

[45] Date of Patent: Oct. 4, 1988

[54] METHOD TO REDUCE PLASMA CHOLESTEROL

[75] Inventors: Sailen S. Mookerjea; Arun Nagpurkar, both of St. John's, Canada; Uday Saxena, New York, N.Y.

[73] Assignee: Canadian Patents and Development Ltd., Ottawa, Canada

[21] Appl. No.: 908,692

[22] Filed: Sep. 18, 1986

[30] Foreign Application Priority Data

Oct. 9, 1985 [CA] Canada .................................. 492653

[51] Int. Cl.$^4$ ............................................ B01D 15/00
[52] U.S. Cl. ................................... 210/670; 210/674; 210/679; 210/691
[58] Field of Search ............... 210/670, 672, 674, 679, 210/691, 282, 502.1, 504, 506, 927; 422/61; 502/403, 407

[56] References Cited

U.S. PATENT DOCUMENTS

| | | |
|---|---|---|
| 3,442,819 | 5/1969 | Herbert ................................. 210/679 |
| 4,384,954 | 5/1983 | Nakashima et al. .............. 210/502.1 |
| 4,476,093 | 10/1984 | Watanabe et al. .................... 210/927 |
| 4,558,014 | 12/1985 | Hirschfeld et al. .................... 422/61 |

Primary Examiner—Ivars Cintins
Attorney, Agent, or Firm—Alan A. Thomson

[57] ABSTRACT

Cholesterol in liquids such as blood plasma can be reduced by passing such liquids over an insoluble matrix such as agarose or treated glass beads to which is attached a C-reactive protein capable of binding cholesterol. An eluent such as sodium chloride or phosphorylcholine can be used to remove bound cholesterol and regenerate the insoluble matrix-C-reactive protein combination for re-use.

10 Claims, No Drawings

METHOD TO REDUCE PLASMA CHOLESTEROL

This invention is concerned with means to reduce cholesterol, especially plasma cholesterol.

Extensive studies on plasma lipoproteins have shown that elevated levels of very low density lipoproteins (VLDL) and low density lipoproteins (LDL) containing apoprotein B are positively correlated to increased risk of coronary heart disease in humans. Familial hypercholesterolemia (FH) is characterized by increased plasma cholesterol concentrations, as well as increased low density lipoproteins (LDL) levels, resulting in premature development of atherosclerosis. Such FH homozygotes may have a circulating LDL level about six times higher than normal. It is also true that FH patients have a mutation in the gene encoding the LDL receptor.

Recent studies have been reported that were designed to reduce plasma cholesterol concentrations in patients by nonsurgical methods by the use of plasmapheresis technique using either heparin-sepharose (see Lupien et al, Lancet (1), 1261–1264, 1975) or dextran-cellulose beads (see Yokoyama et al, Arteriosclerosis 4(3), 276–284, 1984). The plasma cholesterol levels have also been reduced by immunoadsorption method that utilizes a column made by coupling the antibody against LDL to sepharose (see Stoffel et al, Proc. Natl. Acad. Sci. USA 78(1), 611–615, 1981). These approaches have produced transient reductions in plasma cholesterol.

The procedure using heparin-sepharose to lower plasma cholesterol often results in removal of numerous plasma proteins which have a high binding affinity for heparin, as well as results in the removal of high density lipoprotein particles which are known to play a protective role in the development of atherosclerosis. The procedure which utilizes the anti-LDL-sepharose column involves (1) raising monospecific antibodies against LDL, (2) isolation of the antibodies using an appropriate affinity column and, then (3) coupling the antibody to a matrix such as sepharose. These are time consuming procedures and often require a great deal of manipulations and expertise. The use of dextran in the dextran-cellulose method is not a particularly attractive ligand, considering the known effects of the high molecular weight dextrans on the increased precipitation of fibrinogen as well as causing aggregation of platelets.

This invention is based on our studies of the interaction of selected C-reactive proteins with serum lipoproteins and is concerned with means for separating cholesterol from a cholesterol-containing liquid, such as blood plasma, comprising passing such a cholesterol-containing liquid over a selected insoluble matrix, such as activated agarose or activated glass, upon which is immobilized a C-reactive protein, such as rat or hamster C-reactive protein, (i.e. PCBP and FP respectively), capable of binding cholesterol or cholesterol-containing material, thereby to bind the cholesterol or cholesterol-containing material and to separate a liquid with a reduced cholesterol concentration from the matrix.

This invention is further concerned with a composite separation medium comprising such a C-reactive protein capable of binding cholesterol or cholesterol containing material, immobilized on such an insoluble matrix. Such a composite separation medium may be in the form of a cartridge or column and may form part of a cholesterol separation kit to separate cholesterol from blood when in combination with blood plasmapheresis equipment, or, optionally, an eluent, such as aqueous sodium chloride or phosphorylcholine, to elute cholesterol or cholesterol containing material to allow re-use of the composite separation medium with or without such blood plasmapheresis equipment.

DETAILED DESCRIPTION OF THE INVENTION

Note: The terms Phosphorylcholine binding protein (PCBP) and C-reactive protein (CRP) are essentially synonymous and are used interchangeably in the disclosure.

Experimental Procedures

Isolation of PCBP (Rat C-reactive protein (CRP):

PCBP was isolated from serum of normal male rats using a sepharose phenylphosphorylcholine affinity adsorbent. PCBP prepared was analysed by polyacrylamide gel electrophoresis for purity. The inhibitory effect of PCBP on heparin-lipoprotein precipitation reaction was also tested.

Preparation of sepharose-PCBP affinity adsorbent:

Rat PCBP (18 mg in 25 ml of $0.1M NaHCO_3$, 0.5M NaCl, pH 8.3) was added to 5 g of CNBr activated sepharose 4B previously washed with 1 mM HCl (1000 ml). This mixture was gently mixed for 2 hours at room temperature, filtered and then washed alternatively with buffers 0.1m $NaHCO_3$ containing 0.5 M NaCl, pH 8.3 and 0.1M $CH_3COONa$ containing 0.5 M NaCl pH 4.2. The Sepharose-PCBP was treated with 1M ethanolamine (pH 9.0) for 4 hours at 4° C. and was finally resuspended in 0.01M Tris-HCl buffer containing 0.15M NaCl, pH 7.4. The amount of PCBP coupled was 1 mg per ml of sepharose as estimated by difference analysis. PCBP coupled in this way could adsorb the antibodies from antiserum raised in rabbits against PCBP. Blank sepharose was also prepared by treating CNBr activated sepharose 4B in a similar fashion except that no protein was added for coupling.

Isolation of lipoproteins:

Lipoproteins were isolated from fresh rejected human plasma obtained by sequential ultracentrifugation at the following densities, VLDL, (1.006 g per ml); LDL, (1.030–1.063 g per ml); HDL, (1.063–1.21 g per ml) in a Beckman L5–50 B (TM) preparative ultracentrifuge. All lipoproteins were washed once by recentrifugation at the appropriate densities. EDTA was excluded from all solutions required in the isolation and purification of lipoproteins. The protein content of the lipoproteins was measured using bovine serum albumin as standard. Where human plasma was used, blood was freshly drawn into heparinised tubes from healthy non-fasting subjects and plasma prepared.

Electroimmunoassays:

The level of apoliproteins B, E and A-1 were individually quantitated by the electroimmunoassay procedure of Laurell (Anal. Biochem 15, 45–64 (1965). The specific conditions and validation of the assays were done as previously described in Dolphin et al, Atherosclerosis 51, 109–122 (1984). Lp(a) and apo CII were also quantitated by electroimmunoassay procedure. The following conditions were used for the electroimmunoassay of Lp(a): a 2% agarose gel was prepared in 0.06M barbital buffer (pH 8.6) containing 0.4% PEG-6000 (TM). The immunoelectrophoresis was run at 2v per cm for 21 hours at 4° C. For apo CII, a 1.3% agarose gel with 2% PEG-6000 was prepared in 0.05M barbital buffer pH 8.6 containing 0.01% Triton X-100

(TM). The immunoelectrophoresis was run at 2.5 v per cm for 18 hours. The plates were soaked successively in 0.15 NaCl for 1 hour and in distilled water for 15 minutes, covered with filter paper, dried at 60° C. and stained as described. The Lp(a) electroimmunoassay was standardized with isolated Lp(a). Apo CII standardization had previously been calibrated by electroimmunoassay against purified apo CII.

Lipid analysis:

The lipids in the lipoprotein fractions were quantitated by gas chromatographic total lipid profiling method. Briefly, total lipids were first extracted by the method of Folch et al J. Biol. Chem. 226, 497–509 (1957). An internal standard, tridecanoin, was added prior to the lipid extraction. The lipid extraction was followed by phospholipase C treatment of the aliquots. The lipids were finally treated with TRISIL BSA (TM). The total lipid profile was analysed on a Hewlett-Packard 5480A gas chromatographic system using nickel columns packed with 3% OV-1 on gas chrom Q. The particle size of each fraction was estimated from the ratio of core to surface components.

Binding of Lipoprotein to sepharose-PCBP:

Sepharose-PCBP column (5 ml bed volume, 0.7×15 cm) was equilibrated with 0.01M Tris-HCl buffer containing 0.15M NaCl, pH 7.4. Plasma or isolated lipoproteins were applied to the column to test for binding in the presence or absence of 10 mM $Ca^{2+}$. The column was run at a flow rate of 20 ml per hour at room temperature and was then washed with the same buffer until no further material absorbing at 280 nm was eluted. The bound fractions were eluted using a 0 to 250 mM P-choline gradient. Subsequent to this elution, passage of 1.4 M NaCl did not elute any additional lipoproteins. Similar experiments were also performed with blank sepharose to assure that the specificity of binding rested with PCBP.

Analysis of apoproteins by high performance liquid chromatograph (HPLC):

The separation of apoproteins from the fraction bound to sepharose-PCBP from whole plasma, and the apoproteins of isolated VLDL was performed using gel filtration column (300×7.5 mm, TSK-250, Bio-Rad, Richmond, Calif.), on a Perkin-Elmer series 4 HPLC system. The sample (containing about 100 μg protein) was delipidated with ethanol:ether (3:1) at −20° C. The resulting apoproteins were dissolved in 100 μl of 0.2 M Tris-HCl (pH 6.8) containing 3.6% sodium dodecyl sulfate (SDS) and 10% 2-mercaptoethanol. The sample solution was then filtered through a 0.45 μm filter. Fifty μl aliquots containing about 50 μg protein was used for each chromatographic injection. The eluting buffer was 0.5M sodium sulfate, 0.2M sodium phosphate (pH 6.8) containing 0.1% SDS. The effluent was continuously monitored at 280 nm. The column was run at a flow rate of 1 ml per minute.

Binding of VLDL to Sepharose-PCBP:

Application of purified human VLDL to sepharose-PCBP column in presence of 10 mM $Ca^{2+}$ produced evidence that about 38% of the protein passed through the column without binding (Table 1 a). The rest of the protein (about 48%) was retained on the column and was eluted with the P-choline gradient. The distribution of the lipid and protein components of the bound and unbound fractions are also presented in Table 1a. The electroimmunoassay of the apoproteins in these two fractions showed significantly higher amounts of apo B and apo E, 69 and 57% respectively, being recovered from the bound fraction. Analysis of the composition of the bound and unbound VLDL showed that the bound fraction contained more protein and esterified cholesterol but less triglyceride compared to the unbound (Table 1b). The calculated diameters of the two fractions showed that the bound fraction was smaller than the unbound fraction. These results indicate that the bound fraction may represent a partially catabolized VLDL. Since it has been proposed that apo C levels in VLDL decrease progressively during catabolism, the bound and unbound fractions were assayed for apo CII by electroimmunoassay. Results (Table 1d) show the distribution of apo C II between the two fractions. The decreased content of apo C II in the bound fraction further supports that it may indeed represent a partially catabolized VLDI. Table 1c shows that there was no binding of the VLDI, when applied to the column in absence of $Ca^{2+}$ and a control experiment with blank-sepharose column showed no retention of CLDL. Elution with P-choline did not elute any detectable protein from both the columns.

Binding of LDL to sepharose-PCBP

Application of purified LDL (960 μg protein) to the column resulted in quantitative binding of the lipoprotein (Table IIa). The bound LDL was eluted by a P-choline gradient.

Binding of HDL to sepharose-PCBP:

Binding studies of HDL to Sepharose-PCBP showed that in the presence of $Ca^{2+}$, about 80% of protein applied was recovered in the unbound fraction (Table IIIa). Only 11% protein was bound to the column, and was eluted by a P-choline gradient. The apoprotein characterization of the bound fraction included the analysis for Lp (a) since this lipoprotein is known to occur in the HDL density range. The results show two important features. The bound fraction contained 88% of the apo E and 97% of the Lp (a) applied. In contrast, only 7.2% of apo A-1 was recovered in the bound fraction. Enrichment of apo E and apo B was also observed in the bound fraction of VLDL (Table 1a). The analysis of protein and lipid composition of the bound and unbound fractions of HDL showed that the bound fraction contained less protein but more cholesterol esters and phospholipids compared to the unbound fraction (Table IIIb). The increase in cholesterol esters could be related to the presence of Lp (a) in the bound fraction.

Binding of lipoproteins from whole plasma to sepharose-PCBP:

The results presented above with purified lipoproteins showed that the fractions bound to immobilized PCBP had higher concentrations of apo B and E. The possibility that Sepharose-PCBP selectively interacts with these two apoproteins was further investigated by the application of whole human plasma (2 ml, 130 mg protein) to the column. A P-choline gradient was then applied and eluted between 600–900 μg protein. Characterization of the bound fraction with respect to the apoprotein composition revealed that about 48% of apo B and 5% initial apo E were bound to the column. Analysis of the lipids showed 8 and 10% of triglyceride and cholesterol respectively were bound to the column (Table IV). The preferential binding of apo B and apo E containing lipoprotein particles from the whole plasma further demonstrates the selective affinity of Sepharose-PCBP for these two apoproteins.

The elution profile of whole plasma from Sepharose-PCBP when eluted by P-choline gradient resolved into three peaks by gel filtration using HPLC. The three peaks were identified as apoproteins B, E and C based on their retention times which corresponded to those of apoproteins B, E and C resolved from purified VLDL.

TABLE Ia

Distribution of lipid and apoprotein components of VLDL in unbound and bound fractions obtained from a sepharose-PCBP column

| Applied (mg) | | Distribution | |
|---|---|---|---|
| | | % in unbound | % in bound |
| Total protein | 1.55 ± 0.31 (0.71–2.6) | 38 ± 4.1 | *48 ± 5.6 |
| Apo B | 0.54 ± 0.15 (0.16–1.10) | 46 ± 5.6 | *69 ± 10.20 |
| Apo E | 0.17 ± 0.04 (0.06–0.33) | 50 ± 3.4 | *57 ± 4.20 |
| Cholesterol | 0.60 ± 0.16 (0.15–1.08) | 68 ± 7.1 | 58 ± 8.60 |
| Cholesterol esters | 1.10 ± 0.34 (0.21–2.0) | 50 ± 8.2 | 60 ± 11.9 |
| Phospholipids | 1.80 ± 0.53 (0.64–3.75) | 55 ± 6.10 | 64 ± 10.10 |
| Triglycerides | 3.65 ± 1.0 (2.13–7.55) | 66 ± 6.80 | **36 ± 5.20 |

Results show average values (n = 5) with ± S.E. of means and the range of values are given in parentheses.
*P 0.05 compared to the unbound fraction.
**P 0.005 compared to the unbound fraction. Statistical was calculated using Student's unpaired t-test.

TABLE Ib

Composition of the VLDL fractions (% by weight) obtained from Sepharose-PCBP column.

| | Applied | unbound | bound |
|---|---|---|---|
| Protein | 8.75 ± 0.42 | 9.26 ± 0.71 | 11.61 ± 0.26 |
| Cholesterol | 7.00 ± 0.40 | 6.34 ± 0.43 | 7.24 ± 0.79 |
| Cholesterol esters | 14.59 ± 0.50 | 12.29 ± 0.24 | 15.68 ± 0.88 |
| Phospholipid | 20.0 ± 1.36 | 24.50 ± 1.80 | 25.60 ± 1.55 |
| Triglycerides | 57.00 ± 2.8 | 55 ± 2.00 | 50 ± 1.28 |
| Diameter (A°) | 368 ± 20 | 304 ± 27 | 281 ± 24 |

The percent lipid of the fractions was calculated from total lipid profiles.
Protein mass was estimated by the method of Kashyap et al. (8) procedure.
Results are the means ± S.E. values (n = 6).

TABLE Ic

Lack of binding of VLDL on blank sepharose and to sepharose-PCBP in the absence of $Ca^{2+}$.

| | Applied (mg) | % Recovered in unbound fraction |
|---|---|---|
| Blank Sepharose | 1.4 | 88 |
| Sepharose-PCBP in the absence of $Ca^{2+}$ | 1.03 | 84 |

Protein quantitation was performed as described under 'experimental procedure'.

TABLE Id

Distribution of apo CII in the unbound and bound fractions of VLDL

| applied (mg) | Distribution | |
|---|---|---|
| | % in unbound fraction | % in bound fraction |
| 0.078 | 50.64 | 37.25 |

Apo CII was quantitated by electroimmunoassay as described in 'experimental procedure'. The results represent the mean of two separate experiments.

TABLE IIa

Binding of LDL to Sepharose-PCBP and percent recovery of lipids and protein in the bound fraction

| | Applied (mg) | % bound |
|---|---|---|
| Total protein | 0.80 ± 0.08 (0.66–0.96) | 94.1 ± 4.2 |
| Apo B | 0.73 ± 0.08 (0.61 ± 0.89) | 88.6 ± 1.7 |
| Cholesterol | 0.29 ± 0.03 (0.23–0.34) | 91.0 ± 8.6 |
| Cholesterol esters | 1.06 ± 0.12 (0.89–1.3) | 100.3 ± 8.6 |
| Phospholipids | 0.72 ± 0.07 (0.59–0.86) | 86.9 ± 5.6 |
| Triglycerides | 0.14 ± 0.01 (0.12–0.17) | 76.5 ± 3.7 |

Results presented are average values (n = 3) with ± S.E. of means and the range of values are given parentheses. Lipids were determined from total lipid profiles and the apo B was quantitated by electroimmunoassay.

TABLE IIb

Lack of binding of LDL protein when applied to Sepharose-PCBP saturated with P-choline.

| | Applied (mg) | % Recovered in unbound |
|---|---|---|
| Protein | 0.96 | 100 |
| Apo B | 0.90 | 98.6 |

TABLE IIIa

Distribution of apoprotein and lipid components of HDL in unbound and bound fractions obtained from Sepharose-PCBP column.

| applied (mg) | | Distribution | |
|---|---|---|---|
| | | % in unbound | % in bound |
| Total protein | 3.5 ± 1.32 (1.5–6.0) | 80 ± 3.46 | *10.9 ± 0.57 |
| Lp(a) | 0.046 ± 0.016 (0.2–0.08) | ND | 97.5 ± 2.48 |
| Apo E | 0.009 ± 0.002 (0.005–0.013) | ND | 88.8 ± 6.17 |
| Apo A-I | 1.43 ± 0.46 (0.62–2.23) | 85.8 ± 4.9 | *7.26 ± 1.15 |
| Cholesterol | 0.067 ± 0.025 (0.056–0.116) | 57 ± 2.4 | *17.6 ± 0.75 |
| Esterified cholesterol | 0.433 ± 0.169 (0.190–0.760) | 65 ± 2.6 | *9.59 ± 0.54 |
| Phospholipids | 0.610 ± 0.215 (0.260–1.006) | 63 ± 2.1 | *16.4 ± 0.69 |
| Triglyceride | 0.062 ± 0.022 (0.025–0.10) | 65 ± 2.9 | *15.58 ± 0.68 |

Results shown are average values (n = 3) with ± S.E. of means and the range of values were given under parentheses. Lipid and protein quantitation were performed as described under 'Experimental Procedures'. ND = Not detectable.
*P 0.001, compared to unbound fraction. Statistical significance was calculated using Student's unpaired t-test.

TABLE IIIb

Composition of HDL fractions (% by weight) obtained from sepharose-PCBP column

| | applied | unbound | bound |
|---|---|---|---|
| Protein | 62.3 ± 6.3 | 65.9 ± 8.6 | 54 ± 6.9 |
| Cholesterol | 1.5 ± 0.20 | 0.88 ± 0.13 | 3.3 ± 1.9 |
| Cholesterol esters | 10 ± 2.42 | 8.7 ± 0.96 | 16.1 ± 2.0 |
| Phospholipids | 19.1 ± 3.0 | 18.5 ± 3.6 | 24 ± 2.5 |
| Triglycerides | 1.0 ± 0.86 | 1.8 ± 0.06 | 0.8 ± 0.17 |

The percent lipid of the fractions was calculated from total lipid profiles.

TABLE IV

Binding of lipoproteins from normal human plasma to Sepharose-PCBP.

| | applied (mg) | % in bound fraction |
|---|---|---|
| Apo B | 1.54 ± 0.11 (1.33–1.72) | 48.3 ± 0.08 |
| Apo E | 0.07 ± 0.01 (0.06–0.09) | 5.3 ± 1.73 |
| Triglycerides | 3.41 ± 0.60 (2.44–4.52) | 8.3 ± 0.05 |

TABLE IV-continued

Binding of lipoproteins from normal human plasma to Sepharose-PCBP.

| | applied (mg) | % in bound fraction |
|---|---|---|
| Total cholesterol | 3.46 ± 0.53 (2.69–4.50) | 10.2 ± 0.2 |

Results are presented as the mean ± S.E. values with ranges in parentheses (n = 3). Apo B and Apo E were quantitated by electroimmunoassay.

We have devised a method based on our observations and results obtained from our studies of the interaction of rat C-reactive protein with serum lipoproteins. The method involves making an affinity adsorbent to be used to isolate rat C-reactive protein and which could also be used to isolate other C-reactive proteins from different species.

Preparation of immobilized p-aminophenylphosphorylcholine on
 (i) cyanogen bromide activated sepharose 4B, or
 (ii) activated CH-sepharose 4B, or
 (iii) Diisothiocyanate (DITC) activated glass support, or underivitized glass beads.

The ligand p-nitrophenylphosphorylcholine purchased from commercial sources (Sigma) was reduced in methanol by catalytic hydrogenation for 2–3 hours at room temperature and atmospheric pressure in presence of the catalyst 5% palladium on carbon (obtained from commercial sources, BDH). After the appropriate work up, the reduced ligand in 0.1M $NaHCO_3$ buffer containing 0.5M NaCl (pH 8.5) was coupled to an inert matrix which was (i) CNBr-activated Sepharose 4B (TM), or (ii) Activated CH-Sepharose 4B (TM) or (iii) Glass beads (controlled pore size) (Sigma). In case of glass beads, they were derivatized by treating with Gamma-aminopropyltriethoxysilane followed by the reagent p-phenylene diisothiocyanate (DITC). Alternatively one can purchase DITC Activated glass support (200–400 mesh: 37–74μ particle size). After coupling the ligand, the excess reactive groups were blocked by treating the affinity adsorbent with 1M ethanolamine (pH 8.0). The affinity adsorbent prepared was packed into appropriate columns and used to isolate C-reactive proteins from the serum of different species. The adsorbed C-reactive protein from the column was eluted with 7 mM phosphorylcholine solution. Exhaustive dialysis of the eluted proteins resulted in removal of phosphorylcholine. Isolated rat C-reactive protein was then used in the experiment to lower plasma cholesterol.

Preparation of immobilized rat C-reactive protein on cyanogen bromide activated sepharose 4B.

This was achieved by immobilizing rat C-reactive protein to cyanogen bromide activated Sepharose 4B. Rat C-reactive protein in 0.1 M $NaHCO_3$ buffer containing 0.5M NaCl (pH 8.5) was coupled to cyanogen bromide activated sepharose. The protein-sepharose mixture was allowed to mix gently at room temperature for 6–8 hours, after which time it was filtered. The gel was washed well with the coupling buffer and then suspended in 1M Ethanolamine (pH 8.0) for 2 hours. The affinity adsorbent was then packed in an appropriate column and equilibrated in 5mM Tris-HCl containing 0.15 M NaCl (pH 7.5). Plasma from either human or rabbit (normal or diet induced) was then applied to the column and the column washed well with the equilibrating buffer. The bound fraction (containing the apoprotein B and the cholesterol associated with it) was then eluted by the application of a NaCl gradient (0–0.5M). The protein and cholesterol was then estimated from the bound fraction using standard methods.

Preparation of immobilized rat C-reactive protein on DITC activated glass support:

The rat C-reactive protein is coupled to the DITC activated glass support as described below:

Rat C-reactive protein in 0.1M $NaHCO_3$ buffer (pH 8.0) is added to DITC activated glass support, and gently stirred at 4° C. for 16 hours. The solution is filtered on a sintered funnel and the glass beads washed with the coupling buffer. The excess reactive groups are blocked by treating the adsorbent with 1M Ethanolamine (pH 8.0) for 2 hours at room temperature. The affinity adsorbent is packed into appropriate columns and used in experiments as described above. The glass support, being inert, should result in less non-specific binding of serum proteins, a factor of considerable importance in clinical studies.

Use of C-reactive proteins immobilized on various matrices in experimental extracorporeal circuit for plasmapheretic treatment in rabbits and eventually in clinical studies would allow binding of the atherogenic lipoproteins to the C-reactive proteins and thereby reduce plasma cholesterol. The elution of the bound apoprotein B with sodium chloride gradient makes the column re-usable. This procedure is very simple and easy to carry out. The use of porous glass as matrix also reduces non-specific interactions between plasma proteins and the inert glass matrix and is preferred because such interactions are likely to occur in case of agarose or cellulose. The use of C-reactive proteins immobilized on inert matrix such as porous glass is a novel method that eliminates or reduces undesirable effects of the various ligands used in previous studies.

We claim:

1. A method to separate cholesterol from a cholesterol-containing liquid comprising passing said cholesterol-containing liquid over a selected insoluble matrix upon which is immobilized a C-reactive protein capable of binding said cholesterol or cholesterol-containing material thereby to bind said cholesterol or cholesterol-containing material and separating a liquid with a reduced cholesterol concentration from said matrix.

2. The method of claim 1 wherein said cholesterol-containing liquid is blood plasma and said insoluble matrix is selected from the group consisting of an activated agarose support and an activated glass support.

3. The method of claim 2 wherein the activated glass support is a diisothiocyanate activated glass support.

4. The method of claim 1 wherein said cholesterol-containing liquid is blood plasma and said C-reactive protein is selected from the group consisting of rat C-reactive protein and hamster C-reactive protein.

5. The method of claim 1 wherein the cholesterol-containing material comprises low density lipoproteins.

6. The method of claim 1 wherein the cholesterol-containing material is apo B or apo E apoprotein.

7. The method of claim 1 followed by treating the insoluble matrix-C-reactive protein-cholesterol combination with an eluent to elute the cholesterol and regenerate the insoluble matrix to which is linked a C-reactive protein.

8. The method of claim 7 wherein the eluent is an aqueous solution of sodium chloride.

9. The method of claim 8 wherein the aqueous solution of sodium chloride is in the form of a concentration gradient up to 0.5M.

10. The method of claim 7 wherein the eluent is phosphorylcholine.

* * * * *